Feb. 13, 1951  R. A. MARTEN  2,541,878
AERIAL NAVIGATION INSTRUMENT
Filed March 19, 1948  2 Sheets—Sheet 1
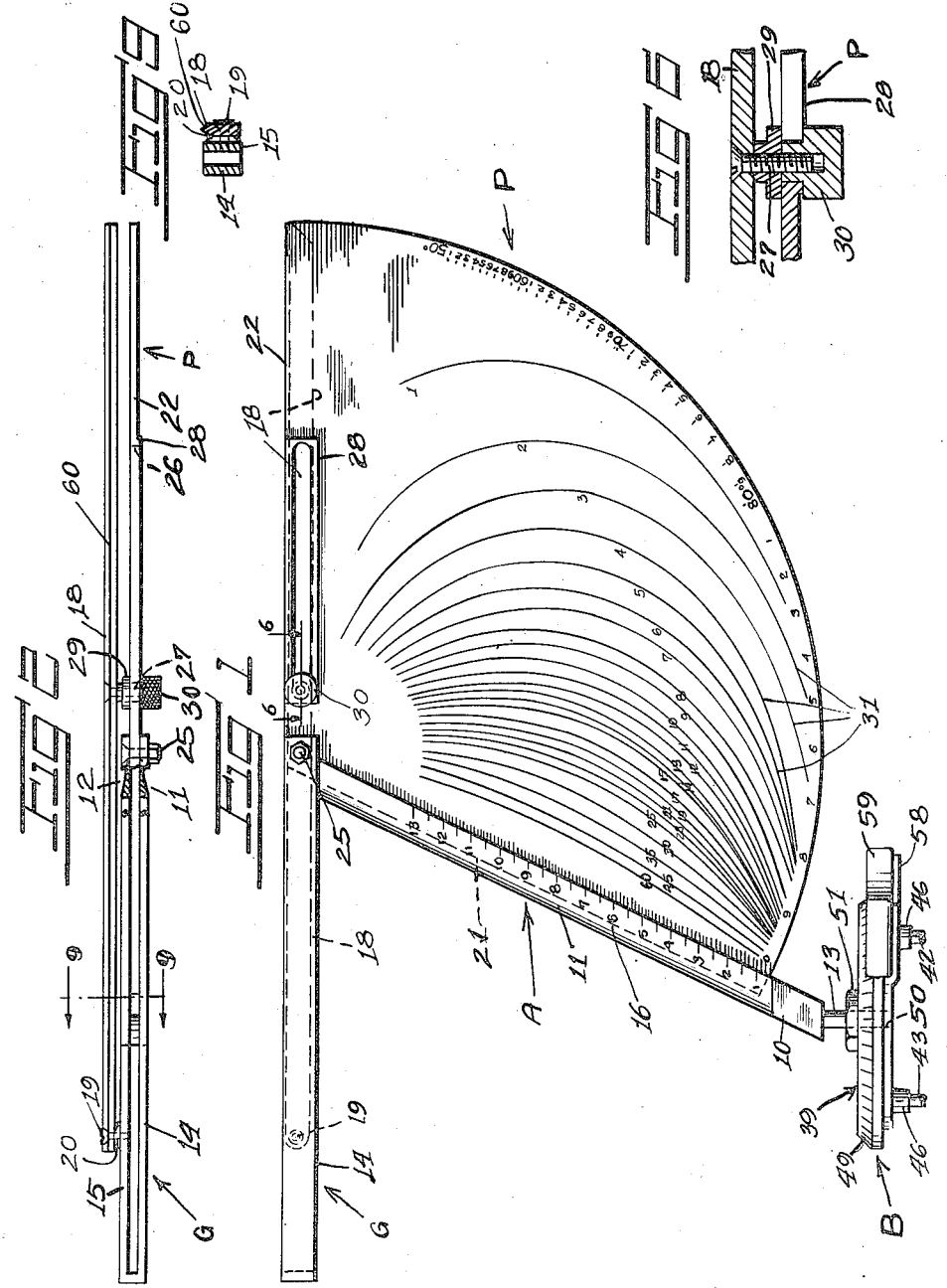
INVENTOR.
Richard A. Marten
BY
Wilfred Lawson
ATTORNEY Feb. 13, 1951 R. A. MARTEN 2,541,878
AERIAL NAVIGATION INSTRUMENT
Filed March 19, 1948 2 Sheets-Sheet 2
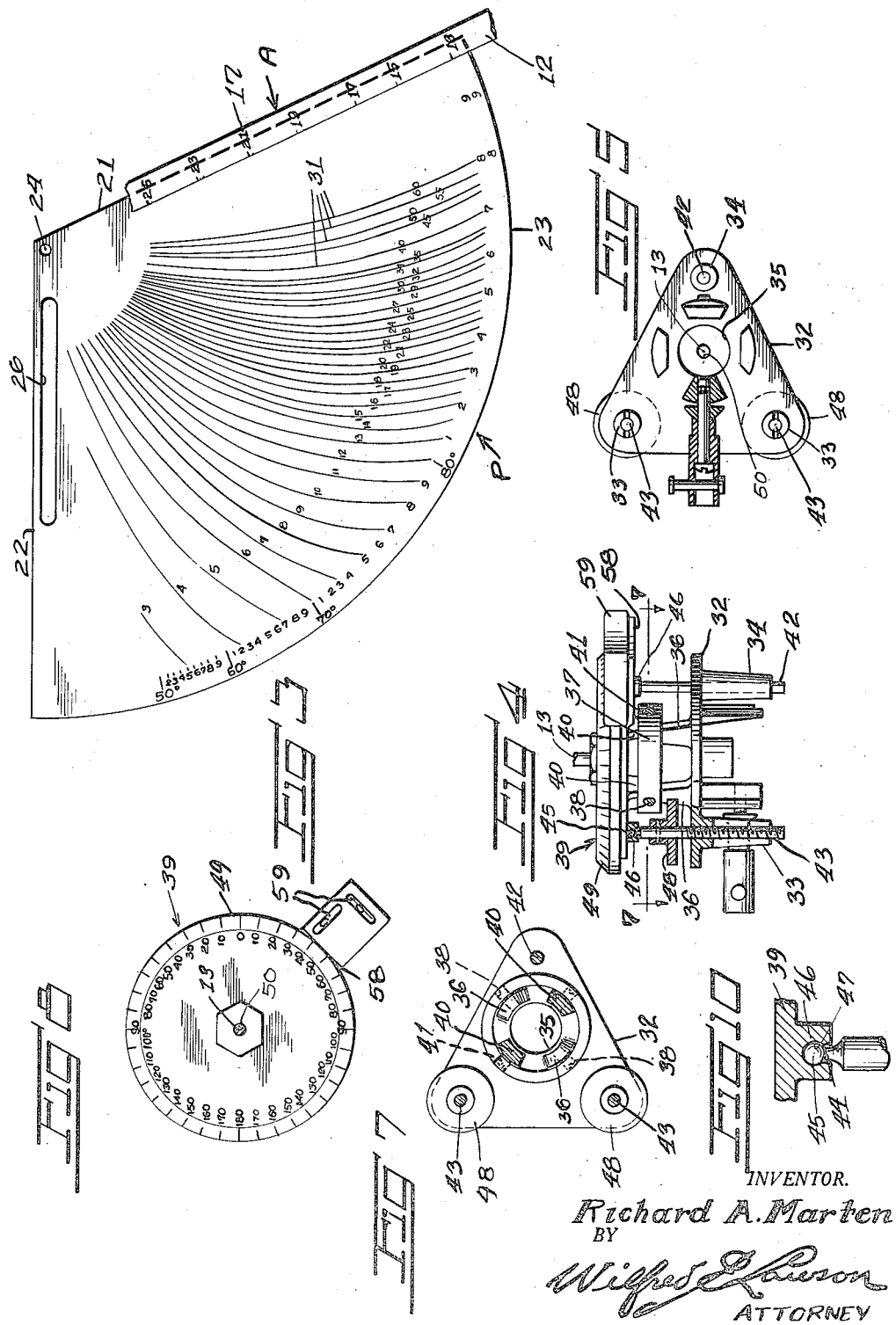
INVENTOR.
Richard A. Marten
BY
Wilfred Lawson
ATTORNEY Patented Feb. 13, 1951

2,541,878

UNITED STATES PATENT OFFICE 2,541,878

AERIAL NAVIGATION INSTRUMENT

Richard A. Marten, Pasadena, Calif.

Application March 19, 1948, Serial No. 15,797

4 Claims. (Cl. 33—71)

My invention relates to aerial navigation instruments and an object of my invention is to provide such an instrument enabling an average pilot, who with the help of his compass and maps, knows approximately the territory over which he is flying, but lacks the necessary fine instruments and the skill to establish his exact location, to do so easily and simply within tolerances of one-half of a mile.

Another object of my invention is to provide an instrument of the character indicated and adapted to be set for a correct reading of the distance in miles from a known point, such as a mountain top, water tower, etc., by adjusting a sighting arm so that it points directly at the known object.

Other objects of my invention not specifically mentioned may appear in the following specification describing my invention with reference to the accompanying drawing illustrating a preferred embodiment of my invention. It is, however, to be understood that my invention is not to be limited and restricted to the exact construction and combination of parts described in the specification and shown in the drawing, but that such changes and modifications can be made which fall within the scope of the claims appended hereto.

In order that my invention may be understood better, I will now proceed to describe it with reference to the accompanying drawing, in the several figures of which similar parts are designated by similar reference characters, and wherein Figure 1 is an elevational side view of the aerial navigation instrument according to my invention, the base thereof being shown fragmentarily.

Figure 2 is a top plan view of Figure 1, partly broken away adjacent pivot bolt 25 and the base being omitted.

Figure 3 is an elevational side view of the altitude indicator arm and of the indicator plate, taken from the side opposite to Figure 1.

Figure 4 is an elevational side view, partly shown in section, of the base for the instrument of my invention.

Figure 5 is a bottom plan view of Figure 4 partly shown in section.

Figure 6 is a sectional view taken on line 6—6 in Figure 1.

Figure 7 is a sectional view taken on line 7—7 in Figure 4.

Figure 8 is a top plan view of the top plate of the instrument base and the spirit levels mounted thereon, and Figure 9 is a sectional view taken on line 9—9 in Figure 2.

Figure 10 is a partly sectional view of a detail of the base.

The aerial navigation instrument as embodied herein comprises a bifurcated altitude indicator arm A having an attaching end portion 10 and two elongated furcations 11 and 12. The furcations have cross sections shaped like right-angled triangles and are arranged so that their outer surfaces slope toward each other as shown in Figure 2. The attaching end portion 10, of the arm A, is engaged by a screw threaded element 13 rising from a base B to be described later; the element 13 supporting the indicator arm A in an upwardly and forwardly inclined position when the element is vertically disposed. A bifurcated guide bracket G is provided with two parallel arms 14 and 15, the forward end portions of which are welded onto the triangular top surfaces of the furcations 11 and 12 respectively, so that the said arms extend substantially at right angles to the axis of the element 13. The sloping outside surface of the furcation 11 is calibrated as at 16 adjacent its forward edge in one thousand feet marks running from one thousand to thirteen thousand feet and the sloping outside surface of the other furcation 12 is provided with a scale 17 divided into one thousand feet marks running from thirteen thousand feet to twenty-five thousand feet.

A sighting arm 18 is pivotally mounted on the outside of the guide bracket arm 15 by means of a pivot screw 19 extending through the sighting arm adjacent its rear end and a globularly curved anti-friction washer 20 arranged between the guide bracket arm 15 and the sighting arm, said screw threadedly engaging the guide bracket arm at a comparatively short distance from its rear end.

An indicator plate P has two straight edges 21 and 22 extending at an obtuse angle to each other and an arcuate edge 23 connecting the ends of the straight edges and forming a sector having a hole 24 in the apex of the angle engaged on a pivot bolt 25 extending through the front end portions of the two arms 14 and 15 of the guide-bracket G, so that said plate is pivotally supported between the furcations 11 and 12, of the indicator arm A.

A slot 26 is provided in the plate P somewhat in front of the hole 24 and extends parallel and adjacent to the upper straight edge 22 of the plate P. A clamp bolt 27 having a countersunk head extends through the sighting arm 18 and through the rearward end portion of the slot 26, when the sighting arm is arranged in horizontal position. The thickness of the portion of the plate P forming the lips of the slot 26 is increased as shown at 28. A spacing washer 29 is arranged between the plate P and the sighting arm 18 and is held in position by the clamp bolt. A knurled nut 30 or the like is mounted on the portion of the clamp bolt projecting through the slot 26 so that movement of the plate relative to the sighting arm or vice versa may be prevented by tightening said knurled nut. Both surfaces of the plate are provided with a plurality of indicator curves 31 etched into said surfaces and laid out according to a carefully worked out diagram. These curves indicate or represent miles and are developed on the base of the well known theory of triangulation with corrections for the curvature of the earth, assuring correct readings inside a limitation of one-half of a mile. The curves are arranged on the plate so that the rear straight edge 21 thereof is chordal with respect to said curves. The edge portion of the plate along the arcuate edge 23 is calibrated in degrees starting with fifty degrees and ending with ninety, adjacent the rear straight edge 21.

The above mentioned base B may be of any preferred construction and is adapted to be mounted at a convenient place in the cock pit of an aeroplane (not shown). In the preferred embodiment shown in the drawing, it comprises a substantially isosceles triangular bottom plate 32, the corners of which are rounded. In each rear corner, a downwardly projecting tubular member 33 is secured to or integrally formed with the bottom plate and in the front corner of the bottom plate a similar member 34 is arranged. Approximately centrally of the bottom plate a round hole 35 is provided and two upwardly extending transversely arcuate lugs 36 are formed on said bottom plate and are located adjacent said hole diametrically opposite to each other. A metal ring 37 is pivotally mounted onto the two lugs by means of pivot screws 38 extending rotatably through the ring and threadedly engaging the lugs. A circular top base plate 39 has two downwardly extending transversely arcuate lugs 40, which are arranged diametrically opposite to each other at such distance from the vertical axis of said top base plate that they are adapted to enter into the metal ring. The top base plate and the ring are pivotally connected with each other by means of pivot screws 41 rotatably extending through the ring and threadedly engaging the top base plate lugs 40. The bottom plate lugs 36 and the top base plate lugs 40 are arranged relative to each other so that the pivot screws 38 in the former and the pivot screws 41 in the latter extend at right angles to each and the axes of these two pairs of screws extend diametrically to the metal ring 37, which is located coaxially with the hole 35 in the bottom plate 32. In this manner the top base plate is supported on the bottom plate by means of a gimbal-like construction.

A rod 42 is arranged in the front tubular member 34 and is secured in position therein in any conventional manner so that it projects above and below the said tubular member. Each of the two rear tubular members 33 is provided with a female thread and a threaded rod 43 is located inside each of these members and engages the corresponding female thread. On the top end portion of each of the three rods 42 and 43, a short reduced neck 44 is formed ending in a ball 45. On the under side of the top base plate 39, three downwardly extending round lugs 46 are formed which are arranged so that they are coaxial with the rods 42 and 43, when the base B is assembled. In the lower end portion of each round lug 46, a socket 47 is provided adapted to receive the corresponding ball 45 rotatably therein. Each socket is partly closed so that the corresponding ball is prevented from slipping out of the socket but is permitted to move therein. A knurled disk 48 or the like is secured to each of the rear rods 43 below the neck 44 thereof, so that the top plate 39 can be adjusted with respect to the bottom plate 32 by selectively rotating the rear rods and thereby lifting or lowering a portion of the top plate relative to the lower plate.

The circumferential edge portion of the top base plate 39 is beveled as shown at 49 and this beveled edge portion is calibrated in degrees.

A tapped hole 50 is provided centrally in the top base plate. The screw 13 on the altitude mount stem 10 is equipped with a jam nut 51 and engages the thread in the hole 50.

When the assembled instrument is mounted on the base B as described, the sighting arm 18 can be arranged horizontally by pivoting it about the pivot 19 so that the upper straight edge 22 of the indicator plate P, which is pivoted simultaneously by the clamp bolt 27, coincides with the upper edge of the sighting arm 18, and by adjusting the top base plate 39 into horizontal position. To control the adjustment of said top base plate, a bracket 58 is provided on said plate and a pair of spirit levels 59 or the like are mounted on said bracket.

The above described navigation instrument is arranged at a convenient place in the cock pit of an aeroplane (not shown). The sighting arm 18 is arranged in horizontal position. Then it is adjusted to point directly at a known object such as a lake, a tower, etc., by sighting along a sight ridge 60, formed centrally on the top edge surface of the sighting arm, and by depressing it until it is in the desired position. Before the arm is depressed, the clamp nut 30 is loosened so that the bolt 27 can slide along the slot 26 in the index plate P and said plate is swung about the pivot bolt 25. The arrangement of the pivot bolt 25 relative to the pivot screw 19 is preferably such that the ratio of the pivotal movement of the plate P to the pivotal movement of the sighting arm is approximately 7 to 1. However, as the sighting arm is extended, the ratio changes gradually to a minimum of 7 to 5. When the arm is located in the adjusted position, the distance to the known object can be determined by reading the altimeter and then ascertaining which mileage curve 31 intersects a graduation on the indicator arm A, e. g., the graduation 16 or 17 on the furcations, corresponding to the reading of the altimeter. When, for instance, the altimeter (not shown) indicates a height of seven thousand feet and the mileage curve eight, on the plate P, intersects the altitude graduation seven, on the arm A, then the sighted object is located at a distance of eight miles from the aeroplane.

I claim:

1. An aerial navigation instrument of the class described, comprising a base, a bifurcated altitude indicator arm rising from said base and inclined relatively thereto, said arm having opposite faces provided with sequential altitude scales calibrated in thousands of feet, a bracket extending from the upper end of said arm horizontally in a direction opposite to that of the inclination of the arm, a sighting arm pivotally connected at one end to said bracket inward from its free end, an indicator plate of sector form having the apex of the angle formed by its side edges pivoted to said bracket adjacent the point of connection of the latter with said indicator arm, said indicator plate having its opposite faces provided with curve scales indicative of distances in miles, and pivot means connecting said sighting arm and said indicator plate, whereby the plate is adjustable relatively to said indicator arm when the sighting arm is adjusted with respect to said bracket.

2. The invention as defined in claim 1, with said indicator arm having its furcations parallel and connected at their lower ends to provide an attaching portion engaged by a screw threaded element rising from said base, each of said furcations having one of said altitude scales delineated on its outer side face, said indicator plate being movable between and relatively to said furcations, when it is adjusted on its pivot connection with said bracket.

3. The invention as defined in claim 1, with said bracket of elongated U-form to provide parallel arms, each arm having its unconnected end rigidly connected with the upper end of a complemental of the furcations of said indicator arm, whereby said indicator plate can pass between the arms thereof when necessary during the adjustment of the same and said sighting arm.

4. The invention as defined in claim 1, with said indicator plate having a slot extending parallel to one of its side edges from a point adjacent its pivotal connection with said bracket, and a nutted clamp bolt carried by said sighting arm and engaged through said slot to secure the arm and plate in positions of adjustment.

RICHARD A. MARTEN.

REFERENCES CITED

The following references are of record in the file of this patent:

UNITED STATES PATENTS

| Number | Name | Date |
| --- | --- | --- |
| 769,526 | Armstrong | Sept. 6, 1904 |
| 1,398,853 | Ginzbourg | Nov. 29, 1921 |
| 2,279,321 | Janssen | Apr. 14, 1942 |